US010082808B2

(12) United States Patent
Wagner et al.

(10) Patent No.: US 10,082,808 B2
(45) Date of Patent: Sep. 25, 2018

(54) METHOD AND CONTROL DEVICE FOR CONTROLLING A HAPTIC ACCELERATOR PEDAL OF A MOTOR VEHICLE BY MEANS OF A POSITION CONTROL

(71) Applicant: Robert Bosch GmbH, Stuttgart (DE)

(72) Inventors: Alexandre Wagner, Stuttgart (DE); Udo Sieber, Bietigheim (DE); Daniel Henning, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 14/361,800

(22) PCT Filed: Oct. 19, 2012

(86) PCT No.: PCT/EP2012/070719
§ 371 (c)(1),
(2) Date: May 30, 2014

(87) PCT Pub. No.: WO2013/087266
PCT Pub. Date: Jun. 20, 2013

(65) Prior Publication Data
US 2015/0127234 A1    May 7, 2015

(30) Foreign Application Priority Data

Dec. 12, 2011    (DE) .................. 10 2011 088 277

(51) Int. Cl.
*G05D 13/62* (2006.01)
*G05D 13/02* (2006.01)
*B60K 26/02* (2006.01)

(52) U.S. Cl.
CPC ........... *G05D 13/62* (2013.01); *B60K 26/021* (2013.01); *G05D 13/02* (2013.01)

(58) Field of Classification Search
CPC ............................ G05D 13/62; G05D 13/02
(Continued)

(56) References Cited

U.S. PATENT DOCUMENTS 5,113,721 A * 5/1992 Polly ............................. 477/80
5,309,361 A * 5/1994 Drott et al. .................... 701/1
(Continued)

FOREIGN PATENT DOCUMENTS

CN    1926002 A    3/2007
DE    25 55 429 A    6/1977
(Continued)

OTHER PUBLICATIONS

International Search Report corresponding to PCT Application No. PCT/EP2012/070719, dated Mar. 11, 2013 (German and English language document) (7 pages).

*Primary Examiner* — Jelani A Smith
*Assistant Examiner* — Majdi Alsomiri
(74) *Attorney, Agent, or Firm* — Maginot, Moore & Beck LLP

(57) ABSTRACT

A method and to a control device for controlling a haptic accelerator pedal in a motor vehicle includes displacing a pedal lever in an actuation direction between a rest position and a maximally actuated position. The pedal lever is configured to be excited by an actuator by exerting a counter force against the actuation direction to generate a haptically perceivable signal. A current position of the pedal lever relative to a current position of the actuator is determined outside the phases for generating the haptically perceivable signal, and the actuator is subsequently controlled in such a manner that the actuator actively follows a change in the determined position of the pedal lever. The positional control is configured to prevent interfering influences on the pedal lever by the actuator.

5 Claims, 2 Drawing Sheets

(58) Field of Classification Search
USPC .......................................................... 701/70
See application file for complete search history.

(56) References Cited

U.S. PATENT DOCUMENTS

| | | | |
|---|---|---|---|
| 6,006,144 A * | 12/1999 | Takahashi et al. | 701/1 |
| 6,378,636 B1 * | 4/2002 | Worrel | 180/65.25 |
| 7,006,917 B2 * | 2/2006 | Hijikata | 701/301 |
| 7,822,526 B2 * | 10/2010 | Sugano et al. | 701/96 |
| 7,946,271 B2 * | 5/2011 | Gregorio | 123/396 |
| 7,966,119 B2 * | 6/2011 | Sugano et al. | 701/96 |
| 8,090,514 B2 * | 1/2012 | Tarasinski et al. | 701/70 |
| 8,090,517 B2 * | 1/2012 | Kobayashi et al. | 701/94 |
| 2007/0085667 A1 * | 4/2007 | Cicilloni et al. | 340/435 |
| 2007/0198136 A1 * | 8/2007 | Kobayashi et al. | 701/1 |
| 2012/0143439 A1 * | 6/2012 | Kim et al. | 701/36 |
| 2012/0167708 A1 * | 7/2012 | Brandt et al. | 74/513 |
| 2012/0325042 A1 * | 12/2012 | Takiguchi et al. | 74/513 |

FOREIGN PATENT DOCUMENTS

| | | |
|---|---|---|
| DE | 199 16 434 A1 | 10/2000 |
| DE | 10 2004 025 829 A1 | 12/2005 |
| DE | 10 2009 045 710 A1 | 4/2010 |
| JP | 2006-281802 A | 10/2006 |
| JP | 2006-285306 A | 10/2006 |
| JP | 2010-155522 A | 7/2010 |
| JP | 2011-68175 A | 4/2011 |
| JP | 2014-89738 A | 5/2014 |
| WO | 2010/130605 A1 | 11/2010 |

* cited by examiner

METHOD AND CONTROL DEVICE FOR CONTROLLING A HAPTIC ACCELERATOR PEDAL OF A MOTOR VEHICLE BY MEANS OF A POSITION CONTROL

This application is a 35 U.S.C. § 371 National Stage Application of PCT/EP2012/070719, filed on Oct. 19, 2012, which claims the benefit of priority to Serial No. DE 10 2011 088 277.4, filed on Dec. 12, 2011 in Germany, the disclosures of which are incorporated herein by reference in their entirety.

BACKGROUND

The present disclosure relates to a method and also to a control device for controlling a haptic accelerator pedal in a motor vehicle. The disclosure further relates to a computer program product which is intended to execute the method according to the disclosure when it is run on a programmable control device, and also to a computer-readable medium in which a computer program product of this kind is stored.

In modern motor vehicles, the driver is assisted by a great deal of provided information when driving the vehicle. For example, it may be helpful to indicate to the driver feedback about specific driving states or requests made of the driver to take specific measures, in order to be able to increase the safety during driving or the convenience for the driver or in order to be able to save fuel. This feedback can be provided in various ways, such as optically or acoustically for example.

Options for providing haptic feedback to the driver by means of the accelerator pedal of the vehicle are additionally also implemented in modern motor vehicles. To this end, the accelerator pedal is equipped with an actuator which allows a force to be deliberately applied to the accelerator pedal. By way of example, the actuator can deliberately counteract further depression of the accelerator pedal starting from a specific accelerator pedal position, in order to in this way indicate to a driver, for example, that greater depression of the accelerator pedal would lead to an overproportional increase in the consumption of fuel.

As an alternative, the actuator can be used to exert a force which varies over time on the accelerator pedal in order to cause said accelerator pedal to oscillate, for example in the form of vibrations or pulses.

In this way, the driver can be provided with notifications and warnings by virtue of haptic perception by the driver or else convenience functions can be provided, without said driver being distracted from observing the traffic, for example, by optical or acoustic signals.

DE 25 55 429 describes a system for generating tactile or haptically perceivable signals in a vehicle.

SUMMARY

In its embodiments, the present disclosure allows advantageous actuation of a haptic accelerator pedal in a motor vehicle. In particular, the disclosure can allow brief generation of a haptically perceivable signal in the accelerator pedal, wherein influences of the actuator on the accelerator pedal, which influences can be perceived as disturbing by a driver, can be avoided or kept small.

In the method proposed here, a pedal lever of the haptic accelerator pedal can be moved between an inoperative position and a position in which it is operated to the maximum extent along an operating direction within a movement range. The pedal lever can be excited in order to generate a haptically perceivable signal by exerting an opposing force counter to the operating direction by means of an actuator. The method is distinguished by a current position of the pedal lever relative to a current position of the actuator being determined, and the actuator being controlled in response to this in such a way that said actuator actively follows a change in the determined position of the pedal lever.

The motivations and ideas on which the method according to the disclosure is based can be seen, amongst other things, in that an actuator of a haptic accelerator pedal is intended to be actuated as far as possible such that it has a smallest possible influence on the pedal lever in time phases at which no haptically perceivable signal is intended to be generated on the pedal lever.

To this end, the disclosure proposes coupling the actuator to the pedal lever of the accelerator pedal not only in such a way that said actuator passively follows the pedal lever when the pedal lever is depressed or released by the driver, for example on account of direct mechanical coupling of the actuator to the pedal lever or on account of spring forces which hold the actuator in operative connection with the pedal lever. Instead, the arrangement or positioning of the actuator is intended to be controlled in a deliberate manner, so that the actuator actively follows a change in position of the pedal lever.

For this purpose, in the case of an actuator which is driven with the aid of an electric motor for example, the electric motor can be actuated by means of a control device such that it always moves actively in the same direction as the pedal lever is currently moving due to the operation by the driver.

Influences on the pedal lever which otherwise would be perceived as being disturbing by a driver can be avoided or at least reduced in this way. For example, forces on the pedal lever, which the actuator would exert on the pedal lever in the currentless state on account of its inertia or difficulty in moving, can be reduced by the proposed active position control. A time variation in a force profile, which a driver would track in the form of a certain ripple in the pedal force profile and which can result from magnetic latching moments of an electric motor of the actuator if said actuator was passively moved, can also be reduced.

A current position of the pedal lever can be determined by means of a pedal lever position sensor for the purpose of position control. In addition or as an alternative, a current position of the actuator can be determined by means of an actuator position sensor. Signals from the pedal lever position sensor can be used as a guide variable for controlling the position of the actuator. Signals from the actuator position sensor can act as a control variable for controlling the position of the actuator.

Owing to position control of this kind, the actuator can move synchronously with the pedal lever. The inertia of the actuator can be accelerated by the actuator itself, so that no or only minor disturbing restoring forces or inertia forces act on the pedal lever.

The actuator can be controlled, in particular, in such a way that said actuator actively follows a change in the determined position of the pedal lever, without a force being exerted between the actuator and the pedal lever in the process.

In other words, the actuator can be controlled to follow a position in such a way that the actuator does not transmit any forces to the pedal lever outside the time phases in which a haptically perceivable signal is intended to be generated in a deliberate manner. As a result, it is possible, in particular, to also eliminate a ripple in the pedal force profile due to magnetic latching moments of the actuator motor.

In this case, the actuator can be controlled in such a way that an offset between a virtual current position of the actuator, in which position the actuator would establish an operative connection with the pedal lever, and an actual current position of the actuator remains within a predetermined offset range.

In other words, the actuator and the pedal lever can be designed such that a mechanical operative connection between the actuator and the pedal lever can be temporarily disconnected, that is to say the actuator can be spaced apart and therefore decoupled from the pedal lever. In this case, the position of the actuator can be controlled in such a way that a spacing or "offset" between the pedal lever and the actuator, that is to say a spacing between a position in which the actuator would have to be moved in order to establish an operative connection with the pedal element and an actual current position, is kept in a predetermined offset range.

As a result, it is firstly possible to ensure that a certain minimum spacing is always maintained and no operative connection and therefore no disturbing transmission of force between the actuator and the pedal lever occur outside the time phases in which haptically perceivable signals are intended to be generated in a deliberate manner. Secondly, it is also possible to ensure that the actuator does not move further than a specific maximum point from a position in which said actuator would be operatively connected to the pedal lever, so that the actuator can always be quickly moved into operative connection with the pedal lever within short reaction times.

In this case, the offset range can be defined, for example, as an angular range of between one and ten degrees, preferably between two and six degrees.

In this case, the angular range can be defined in such a way that it, in relation to the current actuator position, specifies an angle through which the pedal lever at its current position would have to be moved along the operating direction in order to establish an operative connection with the actuator.

In this case, a sufficiently large lower limit of the angular range can ensure that, if the driver suddenly and quickly depresses the pedal lever, the position control means still has enough time to adjust the arrangement of the actuator. An upper limit of the angular range can be selected such that the actuator can always be moved to the pedal lever within a sufficiently short reaction time in order to generate haptically perceivable signals.

The proposed method for controlling the position of the actuator can be further improved by disturbing effects which influence a system response of the actuator being at least partially compensated by a supplementary correction means.

Precise control of the positioning of the actuator generally requires precise knowledge of the system response of the actuator. However, this system response can be influenced by temperature effects, aging effects or other effects. A supplementary correction means can take disturbing influences of this kind into account and at least partially compensate said disturbing influences.

Whereas the actuator is controlled by a position control means in such a way that it actively follows a change in the determined position of the pedal lever in time phases in which no haptically perceivable signal is intended to be generated, the actuator can be controlled by a current control means during a time phase in which a haptically perceivable signal is intended to be generated. In this case, the current is controlled in such a way that a predetermined force profile of a haptically perceivable signal is effected on the pedal lever by controlling a predetermined time profile of the current which is applied to the actuator. The different types of control used in the various operating phases, that is to say position control for as long as no haptically perceivable signal is intended to be generated, and current control when a haptically perceivable signal is generated, allow optimal adjustment of the pedal control means to the various requirements during the different operating phases.

The above-described embodiments of methods according to the disclosure and the functionalities and advantages which can be achieved using said methods can be implemented by a control device, which is provided in a vehicle, for controlling the accelerator pedal.

In this case, the control device can be designed to be able to receive, for example, signals from a pedal lever position sensor and an actuator position sensor and to be able to send control signals to the actuator of the accelerator pedal via suitable interfaces. The generally used term "control device" is not intended to preclude that both control and also active control of the actuator can be carried out in this case. In particular, the control device is intended to be able to actively control the positioning of the actuator such that said actuator follows a change in the positioning of the pedal lever, outside time phases in which a haptically perceivable signal is intended to be transmitted to the pedal lever.

The control device can have a pilot control block for generating an actuating signal for an actuating motor of the actuator. This pilot control block can generate the actuating signal on the basis of a guide signal from a pedal lever position sensor.

Given a corresponding design of the pilot control block and dynamics of the guide signal which are matched to the actuation capability of the actuating motor, a control variable of the actuator position can precisely follow the pre-specified guide signal solely by virtue of the pilot control in this case.

In order to be able to minimize influences on a system response of the actuator, for example on account of temperature effects or aging effects, and associated disturbing influences on the actuating signal for the actuating motor of the actuator, the control device can further have a controller for correcting disturbing effects of this kind.

The control device can implement the proposed control method and any other information evaluation processes of sensor signals in hardware and/or in software. It may be advantageous to program a programmable control device for executing the above-described method. To this end, a computer program product can have computer-readable instructions which instruct the programmable control device to carry out the steps of the respective method. The computer program product can be stored in a computer-readable medium, such as a CD, a DVD, a flash memory, a ROM, an EPROM or the like for example. In order to be able to correctly actuate the arrangement which is to be assumed by the actuator, information about a response behavior which is carried out by the actuator in response to specific control signals, which information is stored in a database or in the form of characteristic curves, or a system response of the actuator can also be used in addition to processing further sensor data.

It should be noted that possible features and advantages of embodiments of the disclosure are described in this document partly with reference to a method according to the disclosure and partly with reference to a control device according to the disclosure. A person skilled in the art will recognize that the individual features can be combined with one another in a suitable manner or interchanged, in particular transferred from the control device to the method and vice versa in order to be able to arrive at further embodiments and possible synergy effects in this way.

BRIEF DESCRIPTION OF THE DRAWINGS

Exemplary embodiments of the disclosure will be described below with reference to the appended drawings. Neither the description nor the drawings are intended to be interpreted as restricting the disclosure.

The figures are merely schematic and not true to scale.

DETAILED DESCRIPTION

Figure 1:
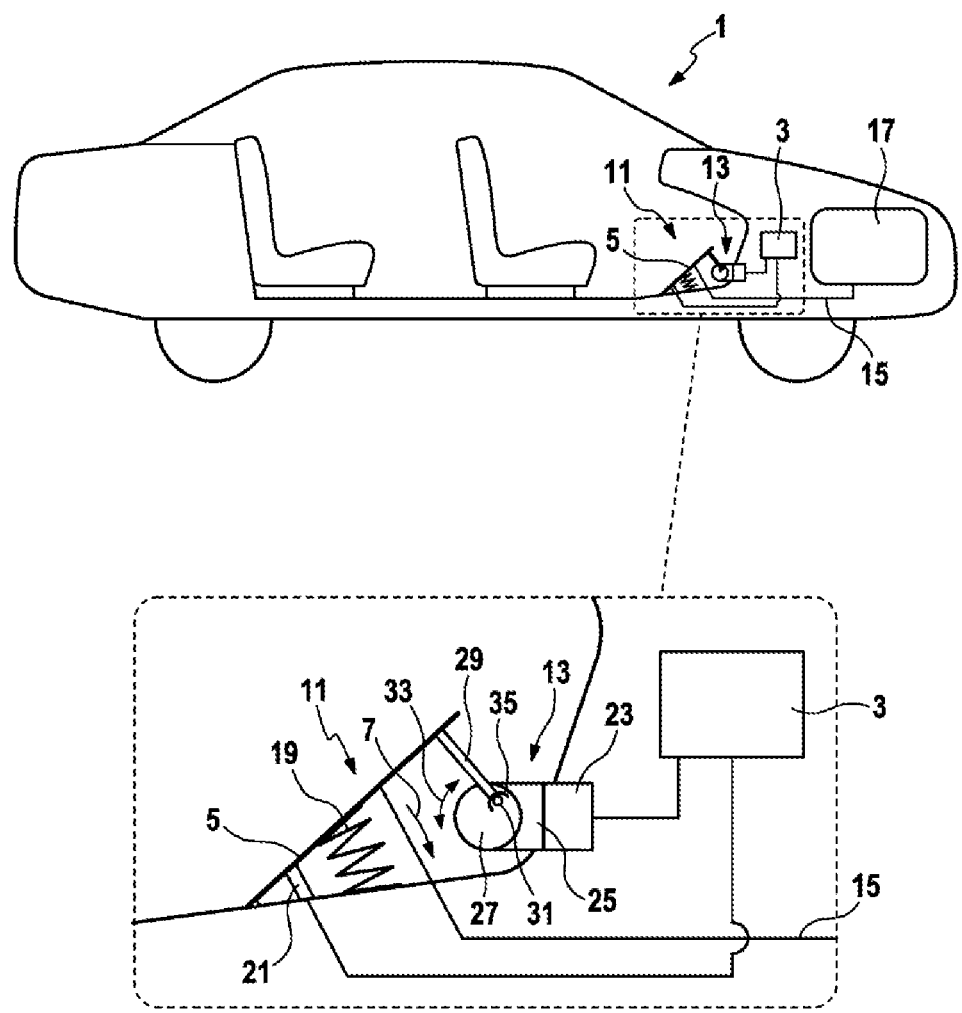
FIG. 1 shows a motor vehicle having a control device for executing a method according to one embodiment of the present disclosure.

FIG. 1 shows a side view of a vehicle 1 with a haptic accelerator pedal 11. By depressing the pedal lever 5, a driver can cause a motor 17 of the vehicle 1 to accelerate the vehicle by means of a cable pull 15 or a cable (not illustrated) which is connected to a motor control device. To this end, the driver has to depress the pedal lever 5 in an operating direction of the arrow 7, as a result of which the pedal lever 5, starting from an inoperative position, can move along a movement range to a position which is operated to the maximum extent. A pedal lever position sensor 21 can determine the current position of the pedal lever 5 in this case. A spring 19 prestresses the pedal lever 5 counter to the operating direction 7 to form the inoperative position.

The accelerator pedal 11 is designed as a haptic accelerator pedal. To this end, the accelerator pedal 11 has an actuator 13 with the aid of which the pedal lever 5 can be moved in a desired direction against the operating direction 7 or force can be applied to said pedal lever in said operating direction. In this case, the actuator 13 can excite the pedal lever 5 to oscillate, for example in the form of vibrations or pulses. As an alternative, the actuator 13 can exert a force on the pedal lever 5, it being possible for this force to make it difficult to further depress the pedal lever 5 and therefore to be perceived by a driver as a pressure point when operating the pedal lever 5.

The actuator 13 can be operated by a DC motor 23 which is coupled to an operating disk 27 by means of a gear mechanism 25. The operating disk 27 can be rotated in the clockwise or counterclockwise direction, as indicated by arrow 33, by operating the motor 23. A cam 31 is provided in an eccentric region on the operating disk 27. This cam 31 can interact with a tappet 29 which is provided on the pedal lever 5. To this end, the tappet 29 has a fork-like receptacle 35 at its end which is directed toward the actuator 13, it being possible for the cam 31 to engage in said receptacle as soon as the operating disk 27 has been rotated into a corresponding position.

As an alternative, the actuator can also be designed as a direct drive, for example with a torque motor, as a result of which high forces can also be generated without a gear mechanism.

The actuator 13 is actuated by a control device 3. The control device 3 identifies when a haptically perceivable signal is intended to be transmitted to a driver by means of the pedal lever 5, in order to indicate to said driver, for example, the possibility of a fuel-saving manner of driving or a hazardous situation. In response to this, the control device actuates the actuator in such a way that a constant force or a force which varies over time is exerted on the pedal lever 5 counter to the operating direction 7.

Figure 2:
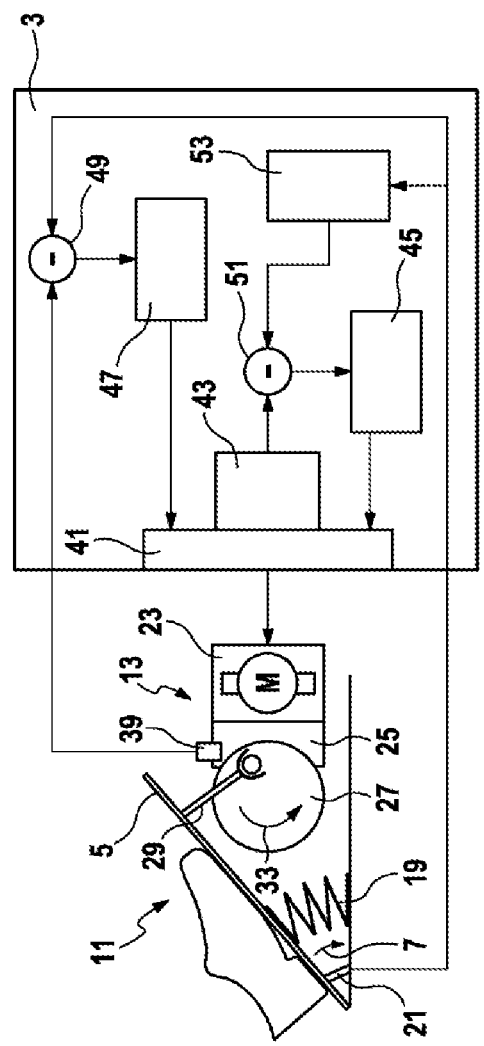
FIG. 2 shows a haptic accelerator pedal having a control device according to one embodiment of the present disclosure.

FIG. 2 illustrates actuation of the accelerator pedal 11 in order to control the actuator 3 outside signal phases, when no haptically perceivable signal is intended to be generated, in such a way that said actuator follows the current position of the pedal lever 5.

Both signals from the pedal lever position sensor 21 and also signals from an actuator position sensor 39 are transmitted to the control device 3. In this case, both sensors 21, 39 can be designed as position sensors or angle sensors.

The signal from the pedal lever position sensor 21 is transmitted as a guide variable to a position control circuit, which is provided in the control device 3, of the actuator. The control variable of this circuit is the signal from the actuator position sensor 39. In the simplest case, the control difference 49 is calculated from the guide variable and the control variable and transmitted to the position controller 47. Said position controller forms a suitable actuating variable for the actuator motor 23. This actuating variable is passed to the motor 23 of the actuator 3 in an amplified form by means of an output stage 41 for as long as the position control circuit is activated. In this case, this activation state is the normal case for as long as no haptically perceivable signal is intended to be generated. The current sensor 43 can additionally be incorporated in the position control circuit (not illustrated). In this case, the properties of the position circuit in respect of its control response over time and its robustness in relation to disturbances are further improved in the form of a subordinate control circuit or a cascade control means.

If a haptically perceivable signal is intended to be briefly generated, for example to provide a warning that the vehicle is approaching a bend or as a signal for reducing fuel consumption, the position control circuit is temporarily deactivated and a current control means is activated. In this case, a suitable current controller 45 controls the actuating current of the actuator motor 23 depending on a desired setpoint current. If the current control means is active, the output signal from the current controller 45 is passed to the motor 23 in an amplified form by means of the output stage by means of the output stage 41. The setpoint current is generated in a special module (53). In general, several force profiles are stored in said module, it being possible to activate said force profiles depending on the driving situation. A force profile is transformed into the setpoint current, which is to be output, by means of current torque constants of the actuator motor and an existing transmission ratio between actuating motor and pedal axis. After the force profile is output, that is to say at the end of the profile or time, the current control circuit is deactivated and the position control circuit is reactivated.

In order to entirely prevent the transmission of force between the actuator 3 and the pedal lever 5, a suitable fixed offset, for example in the range of from two degrees to six degrees, can be continuously transmitted to the pedal angle which is measured by the pedal lever position sensor 21. A variable which is subjected to an offset of this kind can then be used as a guide variable for the actuator position control circuit.

Figure 3:
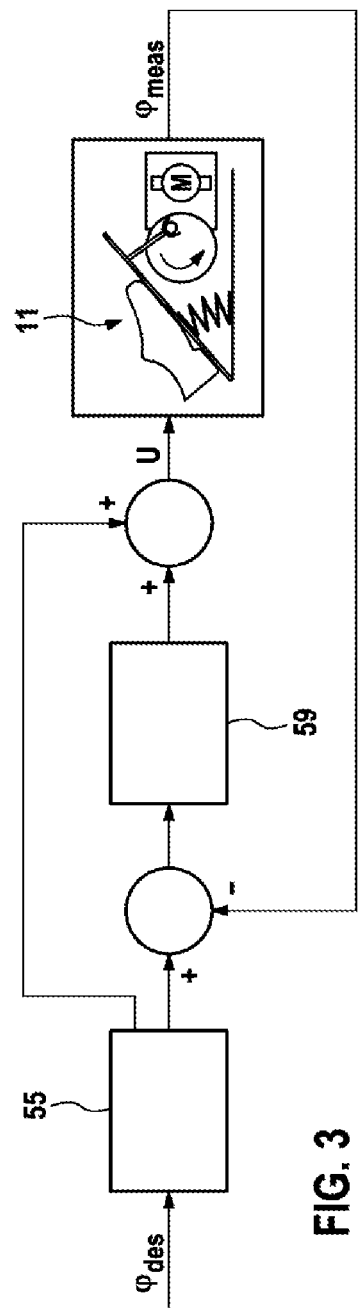
FIG. 3 shows a design of a position control means for a control device according to one embodiment of the present disclosure.

FIG. 3 shows a possible extension of the position controller structure which is illustrated in FIG. 2. An applied guide variable $\varphi_{des}$ is converted into an actuating signal for the actuating motor 23 by a suitable pilot control block 55. Given appropriate design of the pilot control block 55 and dynamics of the guide signal which are matched to the actuating capacity of the actuating motor 23, the control variable $\varphi_{meas}$ an actuator position can precisely follow the prespecified guide signal solely by virtue of the pilot control.

However, an ideal state of this kind requires precise knowledge of the system response of the actuator 13. This ideal state is very difficult to realize on account of temperature, aging and/or other effects. Therefore, a controller 59 which has the task of correcting such disturbing effects is additionally provided.

The invention claimed is:

1. A method for controlling a haptic feedback system for an accelerator pedal in a motor vehicle, the accelerator pedal having a pedal lever configured to move within a predetermined movement range between a first position and a second position and an actuator configured to apply a selective haptic force to the pedal lever the method comprising:
  determining a current position of the pedal lever between the first position and the second position within the predetermined movement range;
  operating the actuator to position a member operatively connected to the actuator at a predetermined distance from the pedal lever in a first mode in which the actuator does not apply a haptic force to the pedal lever;
  operating the actuator to move the member by the predetermined distance within the predetermined movement range to engage the pedal lever in a second mode in which the actuator applies the haptic force to the pedal lever;
  identifying with a pedal lever position sensor a change in position in the pedal lever within the predetermined movement range; and
  operating the actuator to maintain the predetermined distance between the pedal lever and the member during the change in position in the pedal lever in the first mode in which the actuator does not apply the haptic force to the pedal lever.

2. The method of claim 1, wherein the current position of the pedal lever is determined by the pedal lever position sensor, and wherein signals from the pedal lever position sensor are configured to be used as a guide variable to control the position of the actuator.

3. The method of claim 1, wherein the current position of the actuator is determined by an actuator position sensor and signals from the actuator position sensor are configured to be used as a control variable to control the position of the actuator.

4. The method of claim 1, the operation of the actuator further comprising:
  operating the actuator with reference to a current angular position of the pedal lever along the predetermined range of movement to position the member at an angular offset from the pedal lever within a predetermined offset range.

5. The method of claim 1, the operation of the actuator in the second mode further comprising:
  operating a current control device to apply a varying level of haptic force with reference to a predetermined time profile after the pedal lever engages the member connected to the actuator.

* * * * *